United States Patent
Fougnies et al.

(10) Patent No.: US 6,236,851 B1
(45) Date of Patent: *May 22, 2001

(54) PREPAID SECURITY CELLULAR TELECOMMUNICATIONS SYSTEM

(75) Inventors: Douglas V. Fougnies; Dan B. Harned, both of Tempe, AZ (US)

(73) Assignee: Freedom Wireless, Inc., Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/118,378

(22) Filed: Jul. 17, 1998

Related U.S. Application Data

(63) Continuation of application No. 08/559,283, filed on Nov. 15, 1995, now Pat. No. 5,854,975, which is a continuation-in-part of application No. 08/364,479, filed on Dec. 23, 1994, now Pat. No. 5,722,067.

(51) Int. Cl.[7] .......................... H04M 15/00; H04M 17/00
(52) U.S. Cl. ............................ 455/408; 379/144
(58) Field of Search .......................... 455/408, 405–407; 379/111–114, 120, 121, 127, 128, 144, 130

(56) References Cited

U.S. PATENT DOCUMENTS

| | | | |
|---|---|---|---|
| 4,399,330 | 8/1983 | Kuenzel | 340/825 |
| 4,706,275 | 11/1987 | Kamil . | |
| 4,725,719 | 2/1988 | Oncken et al. . | |
| 4,756,020 | 7/1988 | Fodale | 379/112 |
| 4,776,000 | 10/1988 | Parienti | 379/144 |
| 4,776,003 | 10/1988 | Harris | 379/91 |
| 4,831,647 | 5/1989 | D'Avello et al. | 379/91 |
| 4,845,740 | 7/1989 | Tokuyama et al. | 379/91 |
| 4,852,149 | 7/1989 | Zwick | 379/67 |
| 4,852,155 | 7/1989 | Barraud | 379/145 |
| 4,860,341 | 8/1989 | D'Avello et al. | 379/91 |

(List continued on next page.)

OTHER PUBLICATIONS

"Testimony of Scott Silvey, CAL PUC Docket I.88–11–040" (Aug. 30, 1991).

CSI Switch to Radio–Based Cellular Carriers LEC & IXC Interconnections (undated).

Bond, "Cellular Carriers Use Prepaid Programs to Reach Untapped Markets," Billing World, Mar. 1997, pp. 14–17.

Freedom Wireless, "The Freedom to Choose! Get Pre–Pay Cellular," sales pamphlet, undated.

MultiMedia Publishing Corp., "Prepaid Cellular and Prepaid Wireless Market Report and Forecast 1997–2002," sales literature, undated.

NEXTLINK, "Introducing a New Prepaid Telephone Service from NEXTLINK," sales literature, undated.

Open Development Corp., "openMedia Cellular Prepaid," sales literature, undated.

Tecore, Inc., "Pre–Paid Cellular", sales literature, Mar. 25, 1997, pp. 1–4.

*Primary Examiner*—Tracy Legree
(74) *Attorney, Agent, or Firm*—Fish & Richardson P.C.

(57) ABSTRACT

A cellular telecommunications system having a security feature which allows only pre-authorized users to complete cellular telephone calls. The system and method recognizes a cellular radiotelephone's pre-programmed and pre-selected telephone number and an automated number identification code (ANI). The pre-selected telephone number is reserved to the prepaid cellular telecommunications system. The cellular radiotelephone transmits the ANI and a dialed number identification system code (DNIS) to a cellular switch, which contacts a host computer for call validation by the pre-paid service provider. This system also allows pre-authorized users to receive and pay for incoming calls as well as purchase additional air time and monthly access fees with convenient prepaid cards.

56 Claims, 10 Drawing Sheets

U.S. PATENT DOCUMENTS

| | | | |
|---|---|---|---|
| 4,951,308 | 8/1990 | Bishop et al. | 379/144 |
| 5,003,585 | 3/1991 | Richer | 379/144 |
| 5,046,088 | 9/1991 | Margulies | 379/211 |
| 5,127,040 | 6/1992 | D'Avello et al. | 379/58 |
| 5,128,938 | 7/1992 | Borras | 379/311 |
| 5,138,648 | 8/1992 | Palomeque et al. | 379/219 |
| 5,138,650 | 8/1992 | Stahl et al. | 379/61 |
| 5,144,649 | 9/1992 | Zicker et al. | 379/91 |
| 5,220,593 | 6/1993 | Zicker et al. | 379/59 |
| 5,233,642 | 8/1993 | Renton | 379/59 |
| 5,265,155 | 11/1993 | Castro | 379/112 |
| 5,274,802 | 12/1993 | Altine | 395/600 |
| 5,291,543 | 3/1994 | Freese et al. | 379/59 |
| 5,297,189 | 3/1994 | Chabernaud | 379/58 |
| 5,301,223 | 4/1994 | Amadon et al. | 379/58 |
| 5,301,234 | 4/1994 | Mazziotto et al. | 380/23 |
| 5,309,501 | 5/1994 | Kozik et al. | 379/58 |
| 5,321,735 | 6/1994 | Breeden | 379/58 |
| 5,325,418 | 6/1994 | McGregor et al. | 379/59 |
| 5,327,144 | 7/1994 | Stilp et al. | 342/387 |
| 5,341,414 | 8/1994 | Popke | 379/142 |
| 5,353,335 | 10/1994 | D'Urso | 379/67 |
| 5,359,182 | 10/1994 | Schilling | 235/380 |
| 5,359,642 | 10/1994 | Castro | 379/121 |
| 5,440,621 | 8/1995 | Castro | 379/112 |
| 5,465,289 | 11/1995 | Kennedy | 379/59 |
| 5,469,497 | 11/1995 | Pierce et al. | |
| 5,509,056 | 4/1996 | Ericsson et al. | |
| 5,517,555 | 5/1996 | Amadon et al. | 455/408 |
| 5,517,559 | 5/1996 | Hayashi et al. | 379/112 |
| 5,570,416 | 10/1996 | Kroll | 379/144 |
| 5,579,376 | 11/1996 | Kennedy, III et al. | |
| 5,586,175 | 12/1996 | Hogan et al. | |
| 5,592,535 | 1/1997 | Klotz | 455/406 |
| 5,640,447 * | 6/1997 | Fonseca | 379/144 |
| 5,722,067 | 2/1998 | Fougnies et al. | |
| 5,778,313 | 7/1998 | Fougnies | |
| 5,790,636 | 8/1998 | Marshall | |
| 5,826,185 | 10/1998 | Wise et al. | |
| 5,854,975 * | 12/1998 | Fougnies et al. | 455/408 |
| 5,983,091 * | 11/1999 | Rodriguez | 455/405 |

* cited by examiner

PREPAID SECURITY CELLULAR TELECOMMUNICATIONS SYSTEM

CROSS-REFERENCE TO RELATED APPLICATION

This is a continuation of U.S. patent application Ser. No. 08/559,283, filed on Nov. 15, 1995, now U.S. Pat. No. 5,854,975 which is a continuation-in-part of U.S. Ser. No. 08/364,479 filed Dec. 23, 1994 U.S. Pat. No. 5,722,067

BACKGROUND OF THE INVENTION

The present invention relates generally to a cellular telecommunications system having a security feature which allows only pre-authorized users to complete cellular telephone calls. More particularly, the cellular telecommunications system of the present invention permits cellular telecommunications providers to obtain pre-paid subscribers and eliminate credit-risk problems. In addition, the present invention provides anti-fraud protection for cellular service providers by allowing subscribers to designate protection codes which must be dialed before a telecommunications event will be completed. Further, the present invention provides pre-paid calling cards which allow subscriber's to purchase air-time and pay monthly access fees.

Conventional cellular telecommunications systems require the cellular provider to undertake credit screening and certify credit-worthy subscribers before enabling a user to access the cellular telecommunications system. Customarily, a potential subscriber will apply to the cellular service provider, who then undertakes a verification process to determine whether the potential subscriber is creditworthy. If the potential subscriber has a positive credit rating, the subscriber is given access to the cellular system and is able to initiate or receive unlimited cellular telecommunications events during a certain period of time or during a certain number of billing cycles. If the subscriber regularly pays invoices for the telecommunications services, the subscriber's access to the telecommunications system continues unfettered. If the subscriber fails to pay invoices as they become due, the cellular service provider has the ability to discontinue the subscriber's access until the invoice is paid. Thus, pre-paid telecommunications access is a desirable feature to prevent fraudulent use of the telecommunications system. Additionally, the present invention provides anti-fraud capabilities by requiring that a pass-code or personal identification number (PIN) be dialed along with the called number before a telecommunications event will be completed.

Up to now, the cellular service provider had no means available to offer cellular telecommunications services on a prepaid basis, monitor the subscriber's cellular telecommunications usage in real time and discontinue access to the cellular telecommunications services immediately upon exhaustion of a prepaid account balance. Additionally, up to now, cellular service providers had no means available to prevent cellular theft by unscrupulous persons retrieving equipment serial numbers from cellular signal transmissions and "cloning" or reprogramming other cellular equipment to replicate a subscriber's telecommunications profile.

Also, to date, cellular service providers do not have a means to allow current pre-paid subscribers to purchase additional air time and pay for additional monthly access fees in real time at a purchase point other than a cellular service center in order to provide continued use of the cellular service to the subscriber.

DESCRIPTION OF THE PRIOR ART

Land-based telecommunication systems have devised a method for allowing pre-paid telephone usage and limiting telecommunications usage to only a period of time equivalent to the pre-paid value. Perhaps the best example of such a land-based telecommunications system is found in U.S. Pat. No. 5,353,335 issued Oct. 4, 1994 to D'Urso (hereinafter the "D'Urso" patent).

The D'Urso patent discloses a public switched telephone network (PSTN) which operates on a pre-payment system and has multilingual capabilities. A telephone user purchases a predetermined quantum of service, i.e., telecommunications time before access and is provided a card imprinted with a unique account number. The user is also given a series of toll free, commonly known as "1-800" numbers which allows the user to access the prepaid telephone system. Activation of each of the toll free numbers causes the system described in the D'Urso patent to interact with the user in the user's native language or in a language which the user desires to interact with the telecommunications system. Upon dialing an appropriate toll free telephone number at a PSTN node, the user is connected through a switching system with a host computer. The host computer prompts the user, typically by digital voice commands, to enter the user's account number, using the PSTN node keypad, imprinted on the user's account card. The authenticity of the entered account number and the available amount of credit is determined by the host computer. Account authentication and credit balance checking is accomplished by local area network connection with a service management computer which manages a card database containing account information for each outstanding account card. If the account card is valid and an available balance is verified, the host computer prompts the user to enter a speed dialing alias or destination telephone number. The user is given a pre-set number of attempts to enter a valid alias or destination number. The system performs editing checks on the alias or destination number. Improper entry of a speed dialing alias or destination for the pre-set number of attempts will cause the host computer to disconnect the user. Upon proper entry of a speed dialing alias or destination number, the host computer compares the available card balance against the balance required to make a one minute phone call to the desired destination. If the available call balance is greater than or equal to the balance required to make that one minute call, a voice responds unit (VRU) plays an announcement in the user's chosen language informing the user that the call is being processed. The VRU computer uses a stored call rate associated with the caller's destination number and the available credit balance to determine the available call duration. A call duration timer is set in response to the determination of the available call duration.

The VRU computer is then directed to out pulse the digits of the destination number to a network node. When the host computer detects an off-hook condition from the destination, the call duration timer is started and the available call balance is depleted while the call is in progress. When the host computer detects that the available call balance is close to depletion, the VRU computer is bridged onto the call and plays a pending disconnect announcement in the users chosen language. Upon exhaustion of the call balance, the VRU plays a disconnect announcement, the call is disconnected and the host computer sends a message to the service management computer and database that the balance on the card is depleted.

Alternatively, if an on-hook condition at the. destination occurs before the card balance is depleted, the host computer calculates the remaining available balance based upon the condition of the call timer and compares the computed balance to the minimum credit threshold. The host computer then causes a VRU computer to notify the caller, in the chosen language, whether the remaining balance exceeds the minimum credit threshold, and the value of the available balance and then disconnects the calling party. The host computer then sends an update message to the service management computer and the database, notifying them of the calculated remaining balance. The service management computer then overwrites the present balance on the database with the calculated balance sent by the host computer.

While the D'Urso telecommunications system allows for prepaid telecommunications activity, it is wholly dependent upon user first calling a toll free number, inputting account information, waiting for account validation, inputting the called destination, waiting for destination validation and then either being connected or not. The D'Urso system requires a plurality of input events by the user before a call can be passed to the destination. Moreover, the D'Urso system lacks direct interface with the remote database for real time account balance adjustment during a telecommunications event. Rather, in the D'Urso system a host computer queries a remote management server database to determine an available credit balance. The host computer then looks up a telecommunications rate for the destination number called, calculates a time value corresponding to the credit balance for the destination number and either authorizes or rejects the attempted call on the basis of the calculated time value. If the attempted call is authorized, a calculated time value timer is set. Upon occurrence of an off-hook condition at the destination called, the calculate time value timer at the host computer is decremented until a pre-determined threshold value. As the threshold value is reached, a voice messaging is bridged onto the call to advise the user of the remaining calculated time value. Upon expiration of the calculated time value, the call is disconnected. After disconnection due to either 1) expiration of the calculated time value, or 2) an on hook condition at the called destination, the host computer recalculates the credit balance from the remaining time value and sends an update record to the management server and database and overwrites the previous credit balance information stored at the database. In this manner, the database is not actively updated as the telecommunications activity is occurring.

Those skilled in the art will understand and appreciate that the prepaid land-based telecommunications system described in the D'Urso patent is fundamentally different from the cellular-based telecommunications system of the present invention.

SUMMARY OF THE INVENTION

A need has been recognized for a cellular telecommunications system which permits access by pre-paid users, without the need for modifying the cellular radiotelephones commonly in use. The present invention provides a system and method which recognizes cellular radiotelephones pre-programmed with a pre-selected telephone number and an automated number identification code (ANI). The pre-selected telephone number is reserved to the prepaid cellular telecommunications system. The user merely enters the destination telephone number and activates an off-hook condition, typically by depressing a "send" button on the keypad of the cellular radiotelephone. The cellular radiotelephone then transmits the ANI and a dialed number identification system code (DNIS). Because all cellular systems operate on the basis of discrete cell sites, which re-transmit the received signal to a central cellular service organization cellular switch, both the ANI and the DNIS are transmitted to the cellular switch. At the cellular switch, the ANI is recognized as one reserved to the pre-paid cellular system and is re-directed, along with the DNIS, to the pre-paid cellular system switch via T1 land lines or via cellular re-transmission.

At the pre-paid cellular system switch, a host computer authenticates both the ANI and DNIS. Upon recognition of a valid ANI, the host computer establishes communications via either a local area network (LAN) or wide-area network (WAN) with a remote computer database server. At the remote computer database server, a database is maintained with pre-paid subscriber information. The pre-paid subscriber database contains records of each pre-paid subscriber. Each subscriber record in the database includes, at least the ANI assigned to that pre-paid subscriber, a pre-paid account balance and a time rate for telecommunications charges.

The host computer validates the received ANI by comparison to the ANI information in the database. Upon validation of the received ANI, account balance information for the account associated with the received ANI is queried to determine if there is a positive credit balance. Upon verification that the account has a positive credit balance, the host computer out pulses the dialed destination telephone number to a local exchange carrier, such as one of the Regional Bell Operating Companies.

During the call progress, the account balance information at the computer database server is decremented based upon elapse of pre-determined time periods at the predetermined time value for cellular telecommunications. It is important to note the time value is deducted from the account balance at regular intervals of time while the call is in progress.

The present invention allows a pre-paid user to access the cellular telecommunication system and have authentication and accounting occur transparently without any preliminary input by the user. The present invention accomplishes this by using the ANI as the file link to identify and authenticate the cellular telephone against the database. Thus, cellular telephone users are freed of the need to carry and use cards, are freed of the need to enter account information as a first step in the authentication process and the possibility of fraud on the cellular service providers is minimized.

The present invention also allows pre-paid subscribers to accept incoming calls from landline callers and provide a prepaid calling card procedure to subscribers so that the system's subscribers can conveniently purchase additional air time and pay monthly access fees. Finally, the present invention provides a unique interface between the system cellular switch and point-of-sale (POS) so that messages and data packets can be passed back and forth to perform specifically desired transactions.

These and other objects, features, and advantages of the present invention will become more apparent to those skilled in the art from the following more detailed description of the present invention when taken with reference to the accompanying drawings.

DETAILED DESCRIPTION OF THE PREFERRED EMBODIMENTS

Figure 1:
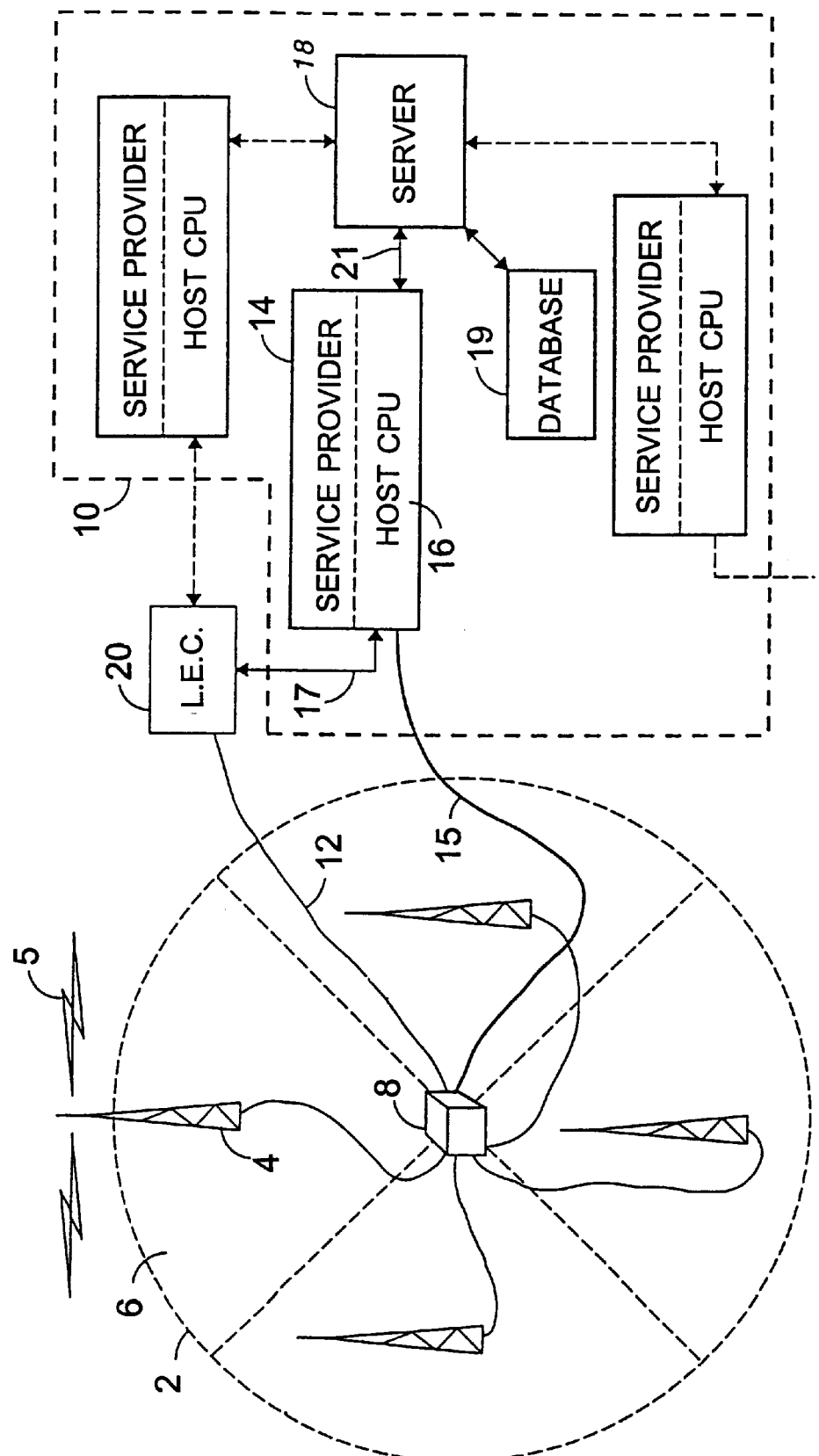
FIG. 1 is a diagrammatic view of a typical cellular telecommunications system interfaced with the cellular telecommunications system of the present invention.
Figure 2:
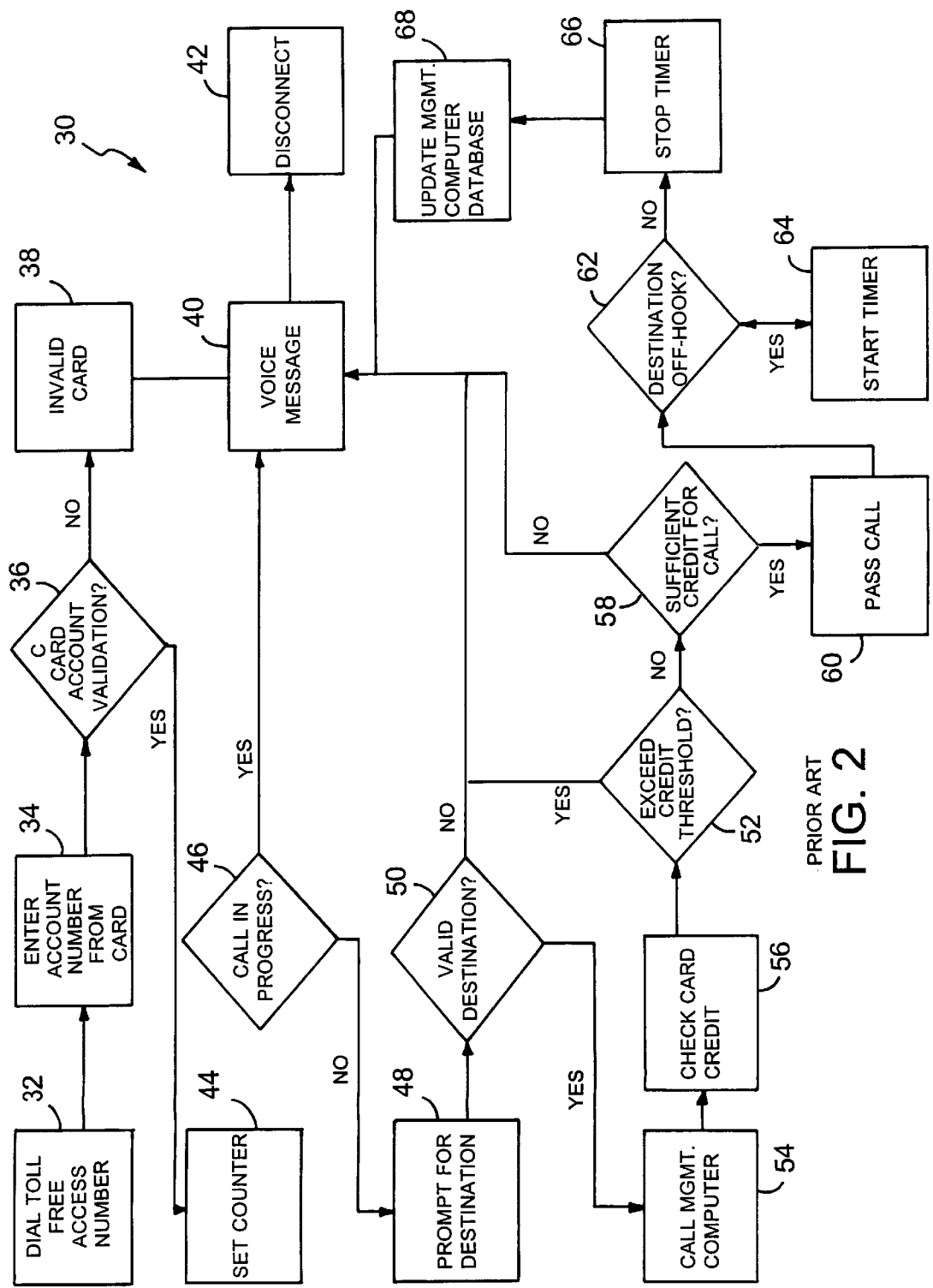
FIG. 2 is a diagrammatic call flow of the prior art prepaid land-based telecommunications system.

The prepaid cellular telecommunications system of the present invention is best illustrated with reference to the accompanying drawings in which FIGS. 1 and 3 through 8B generally describe the system of the present invention and FIG. 2 depicts the prior art system described in the D'Urso patent.

With particular reference to FIG. 1, the pre-paid cellular system 10 of the present invention is illustrated. The pre-paid cellular system, 10 interfaces with a conventional cellular telecommunications switched network 2. Conventional cellular telecommunications switched network 2 is a network consisting of a plurality of cellular antennae, such as antenna 4, capable of receiving cellular band RF signals 5, with each antenna being located in a discrete cell site, such as site 6. Each antenna is electrically linked to cellular switch 8 which governs the operation of the cellular telecommunications switched network 2 and links the network 2 to local exchange carrier 20 via T1 land line 12.

In accordance with the present invention, a cellular service provider 14 is linked to the cellular telecommunications switched network 2 cellular switch 8 via T1 land lines 15. The cellular service provider 14 has a plurality of cellular telephone numbers reserved to it for pre-paid subscribers. Each reserved cellular telephone number has a unique automated number identifier (ANI) associated with the reserved telephone number. These reserved cellular telephone numbers are stored in a switch computer resident at switch 8. The cellular service provider 14 is electrically linked to the local exchange carrier 20 via T1 land lines 17 to communicate cellular telephone calls from the service provider 14 to the local exchange carrier's regular network.

The service provider 14 has host computer 16 which is preferably networked through either a local area network (LAN) or wide area network (WAN) 21 to a remote server computer 18. In this manner a plurality of service providers may, within a single cellular service, operate from the same remote server computer 18. The remote server computer 18 has an associated database 19 of pre-paid subscribers, which is independently accessible by each of the service providers.

The host computer is preferably based upon a multi-processor platform such as those made by Intel Corporation and based upon the 486 or PENTIUM microprocessor, with each host computer having a plurality of modems and network interface circuit boards capable of simultaneous bi-directional processing of telecommunications data between the T1 land lines 15 and the modems and between the host computer and the remote server. The remote server is also preferably a multi-processor based platform capable of distributed load processing, and fitted with a plurality of network interface circuit boards. The database is preferably stored across a plurality of hard disk drives configured as a redundant array of independent drives (RAID).

In the foregoing manner, a cellular transmission 5 received by an antenna 4 within a cell site 6 is received at switch 8. If the ANI and DNIS transmitted with the cellular transmission 5 is one of the reserved pre-paid cellular telephone numbers, the switch 8 re-directs the transmission 5 to the service provider via the T1 and line 15. The transmission 5 is communicated to the service providers' host computer 16, which then authenticates the ANI and DNIS by accessing the server computer 18 and database 19. Upon valid authentication of the ANI and DNIS, the subscriber identity is validated. The database 19 will have records indicative of the subscriber's account balance. A check of the subscriber's account balance in the database 19 is made to validate the presence of a pre-paid balance sufficient to supply a pre-determined quantum of telecommunications, e.g., one minute, at a predetermined telecommunications charge rate associated with both the dialed number and the time of day in which the call is placed. Upon account balance validation, the host computer 16 validates the call and passes it to the local exchange carrier 20 via the T1 land line 17.

A pre-payment telecommunications system 30 of the prior art is illustrated with reference to FIG. 2. The system 30 requires that a pre-paid user first dial a toll free access number at block 32. Upon connection with the toll free access number, the user must enter an assigned account number imprinted on a card at block 34. After the card account number is validated at block 36, a counter is set at block 44 and a check is made at block 46 to determine whether a call on the entered account is in progress. A negative validation at block 36 will cause an invalid card flag to be initiated at block 38 and an appropriate voice message from a voice response unit (VRU) announced at block 40. If an affirmative response is not elicited from the check at block 46, the VRU prompts the user to enter a destination telephone number at block 48. A validation check is made at block 50 of the dialed number entered in response to the VRU prompt at block 48. If the validation check at block 50 is affirmative, a database associated with a management computer is called at block 54 and the account's records are retrieved for credit balance determination. A check is made of the credit associated with the card account to determine whether the user's account has any available credit at block 56 and whether the available credit exceeds a pre-determined minimum threshold at block 52. An additional check is made to determine whether sufficient credit in the user's account balance to pay for a threshold time value of a call, e.g., one minute, based upon a time value rate for the destination being called is determined at block 58. If the determinations made at blocks 52, 56 and 58 are negative for block 52 and affirmative for block 56 and 68 the call is passed by out pulsing the dialed number at block 60. If a negative determination at any of blocks 56 or 58 or an affirmative determination at block 52 is made, an appropriate voice message is played by the VRU at block 40 and the user is disconnected at block 42.

Upon connection with the destination number, an off-hook condition of the destination is sensed at block 62. If an off-hook condition exists at the destination, a timer is started at block 64 which continues until an off-hook condition exists at the destination and the timer is stopped at block 66.

Upon a stop timer condition at block 66, the management computer is called and updated by overwriting the user's account record with updated information based upon the elapsed time of the call and the time value of the call at block 68. The VRU then issues an appropriate voice message 40 to advise the user of the revised account balance and whether the user is disconnected at block 42.

As will be understood by those skilled in the art, the foregoing description of the pre-paid telecommunications system of the prior art 30 requires the user to first access a toll-free number to be linked to a host computer, and then must enter an account code and wait for validation and then enter a destination number, and wait for validation before the call is passed. The present invention operates advantageously with a cellular telecommunications system to eliminate the need for a toll free host computer to interact directly with the user, and eliminate the need for the pre-paid user to make multiple keypad entries. Rather, as will be more apparent from the following description of the preferred embodiment, the user only enters the destination number and all call processing is handled by the host computer in conjunction with the cellular switch.

Turning now to FIGS. 3–8B, call flow in the pre-paid cellular telecommunications system of the present invention is illustrated. It is important to note that the cellular radiotelephones used by pre-paid subscribers are of a conventional type, without special circuitry, modification or programming. Rather, each cellular radiotelephone used by prepaid subscribers is programmed, in the normal manner, with a predefined cellular telephone number reserved to the pre-paid cellular telecommunications system 10.

Figure 3:
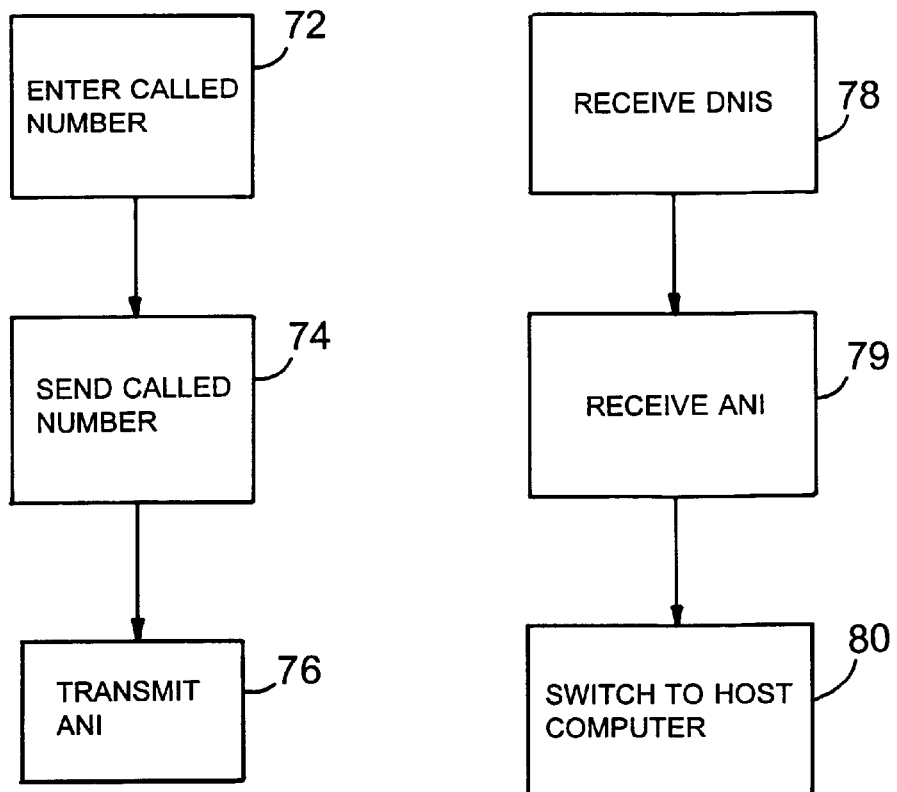
FIG. 3 is a call flow diagram from a typical cellular radiotelephone.

FIG. 3 illustrates call initiation by a pre-paid cellular telecommunications subscriber. The subscriber initiates a cellular call at block 72 by entering the destination number directly at the keypad of the cellular radiotelephone. After the subscriber enters the called number, the subscriber sends the destination number (DNIS) by activating a send key on the keypad of the cellular radiotelephone at block 74. The cellular radiotelephone then transmits the DNIS and an ANI unique to the transmitting cellular radiotelephone at block 76 as cellular signals 5 to the nearest antenna within the cell site.

Figure 4:
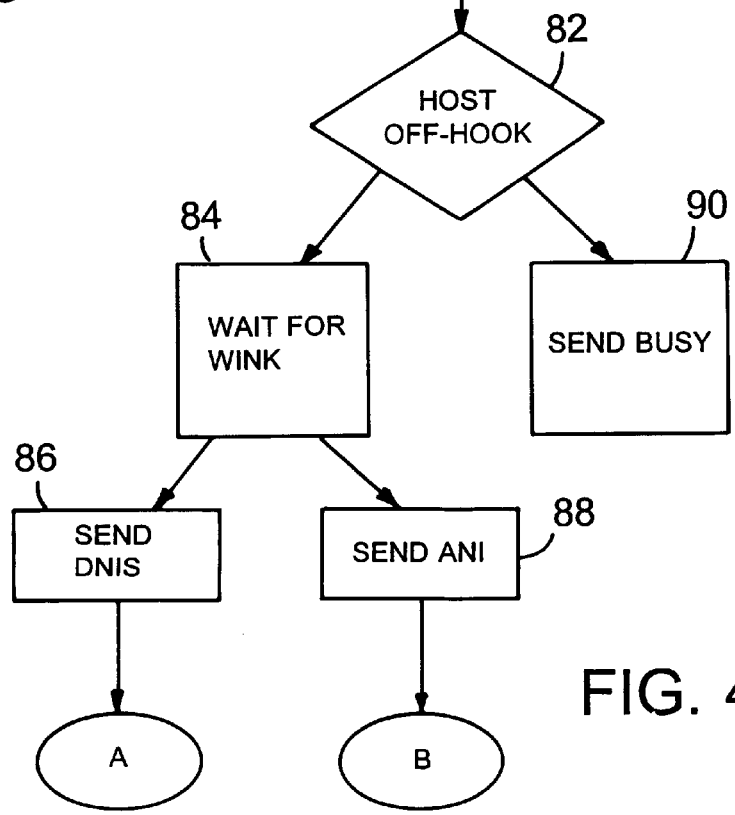
FIG. 4 is a call flow diagram at a cellular switch in accordance with the present invention.

FIG. 4 illustrates call processing by the cellular switch 8. The cellular switch 8 is constantly in a wait condition for receipt of cellular transmission from a plurality of subscribers within the coverage area of the cellular switch. The cellular switch receives the transmitted DNIS at block 78 and the transmitted ANI at block 79. Upon recognition of the ANI as a unique ANI identifying a subscriber in the inventive pre-paid cellular system, the cellular switch routes the cellular call through a direct line to a host computer of the inventive cellular system at block 80 and goes off-hook to the host computer at block 82. The cellular switch then waits for receipt of a wink signal at block 84. Upon receipt of a first wink signal at block 84, the cellular switch sends the ANI to the host computer at block 88. Those skilled in the art will understand that the sequential order of sending the DNIS and ANI may be reversed. After sending the DNIS and ANI, the cellular switch waits for an off-hook condition from the host computer to connect the cell. If the host computer fails to go off-hook within a pre-determined period of time, the cellular switch drops the caller.

Figure 5:
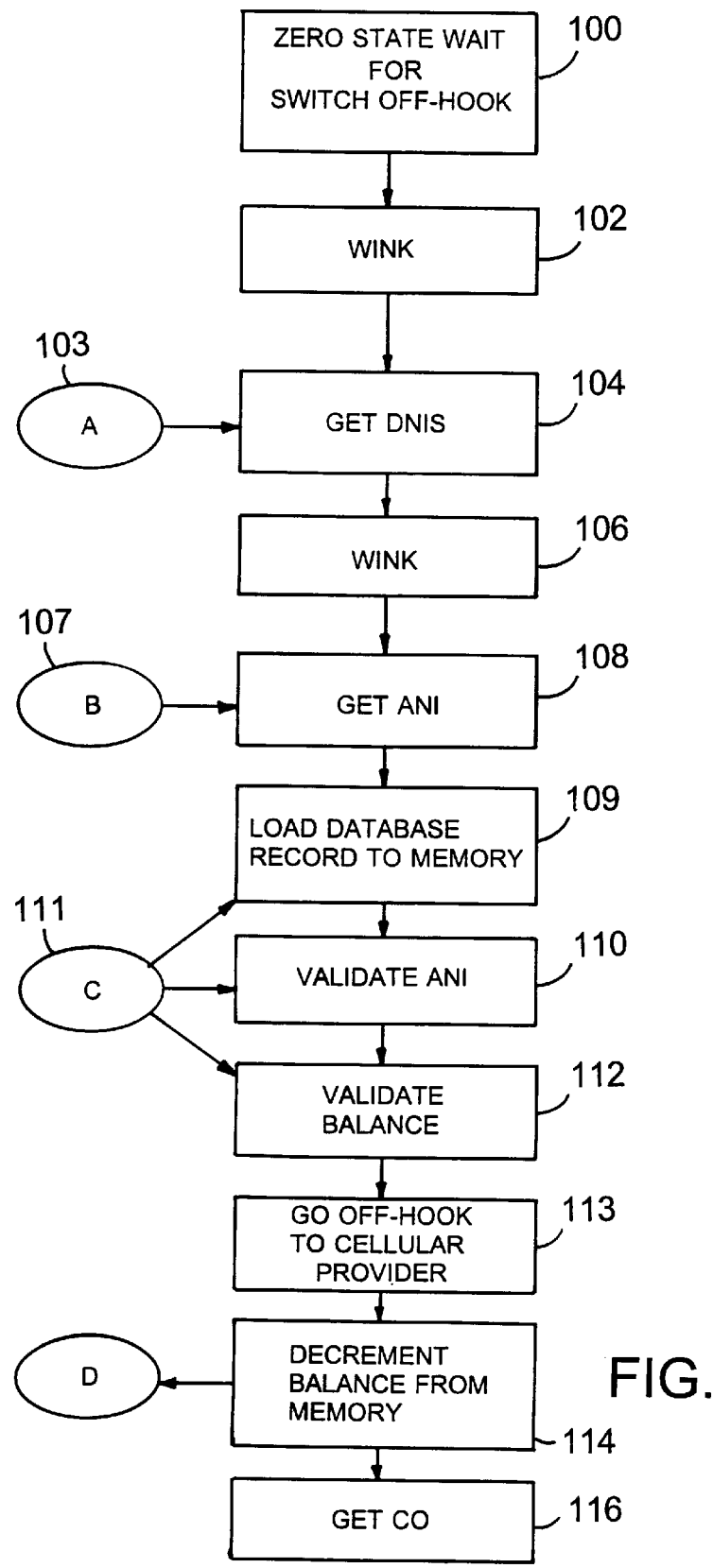
FIG. 5 is a flow diagram illustrating call validation processing at a host computer in accordance with the present invention.

Call processing at the host computer is illustrated in FIG. 5. The host computer's initiated zero state is to wait for a cellular switch off-hook condition to the host computer. Upon receipt of an off-hook condition from the cellular switch, the host computer send a first wink signal to the cellular switch at block 102 which tells the cellular switch to send the DNS. The host computer then receives the DNIS 103 from the cellular switch at block 104. After receiving the DNIS at block 104, the host computer sends a second wink signal to the cellular switch at block 106 which tells the cellular switch to send the ANI. The host computer then receives the ANI 107 from the cellular switch at block 108. The host computer accesses the subscriber database from the remote server 11 and loads the database record corresponding to the received ANI to memory at block 109. The received ANI is validated against the database record in memory as one belonging to a pre-paid subscriber at block 110. Upon ANI validation at block 110, the host computer then validates the subscriber's pre-paid balance based upon the DNIS and time of day rate, e.g., peak or off-peak time rates, at block 112.

Those skilled in the art will understand and appreciate that the processing of the DNIS and ANI signals may occur in reverse order, and that different cellular service providers may use alternative signals to represent the dialed number and the subscriber's cellular radiotelephone. For example, the cellular radiotelephone's electronic serial number (ESN) may be transmitted instead of the ANI. The ANI is referenced, herein only by way of example.

Upon balance validation at block 112, the host computer goes off-hook to the cellular provider at block 113 and a predetermined minimum time rate is decremented from the subscriber's balance in memory at block 114 and then the call accounting loop is initiated at block D. While at present time, it is preferable to use memory, those skilled in the art will understand that future improvements in LAN and WAN communication speeds and database read-write speeds may obviate the desirability of loading the accounting processing. The host computer then out pulses the DNIS, or another host computer-modified signal including the called telephone number, such as a pass-code or PIN number, or the DNIS stripped of the area code, to the local exchange carrier for connection to obtain a central office (CO) line at block 116.

Figure 6:
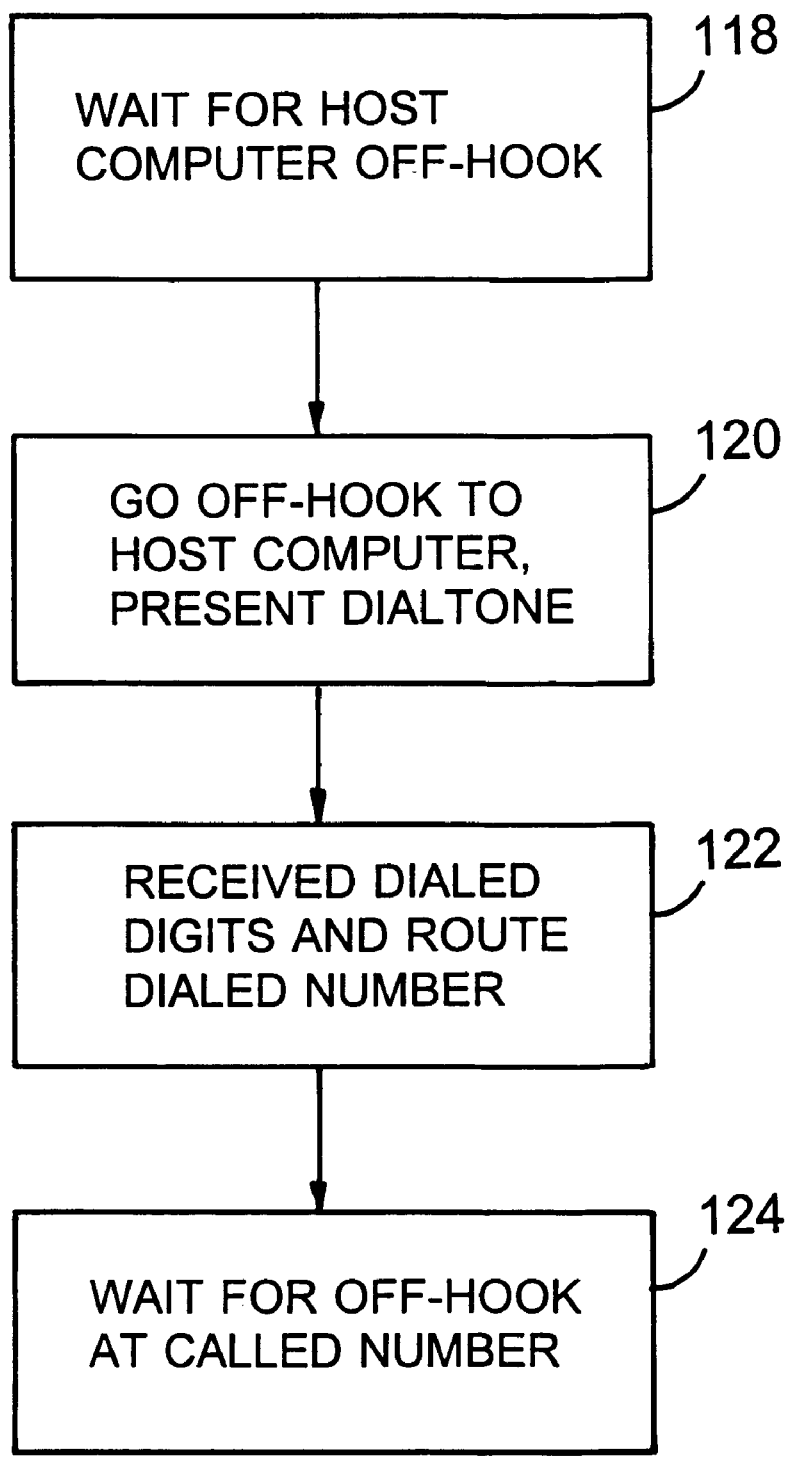
FIG. 6 is a flow diagram illustrating call processing at the central office in accordance with the present invention.

Turning now to FIG. 6, the CO is in a zero state waiting for an off-hook from the host computer at block 118. Upon an off-hook condition from the host computer at block 118, the CO goes off hook to the most computer and presents a dialtone at block 120. After the Ti land line has been seized, the DNIS or a host-computer modified DNIS, is received and routed over the T1 land line to the number dialed out by the host computer at block 122. The CO then waits for an off-hook condition at the called telephone number at block 124 and connects the call.

Figure 7:
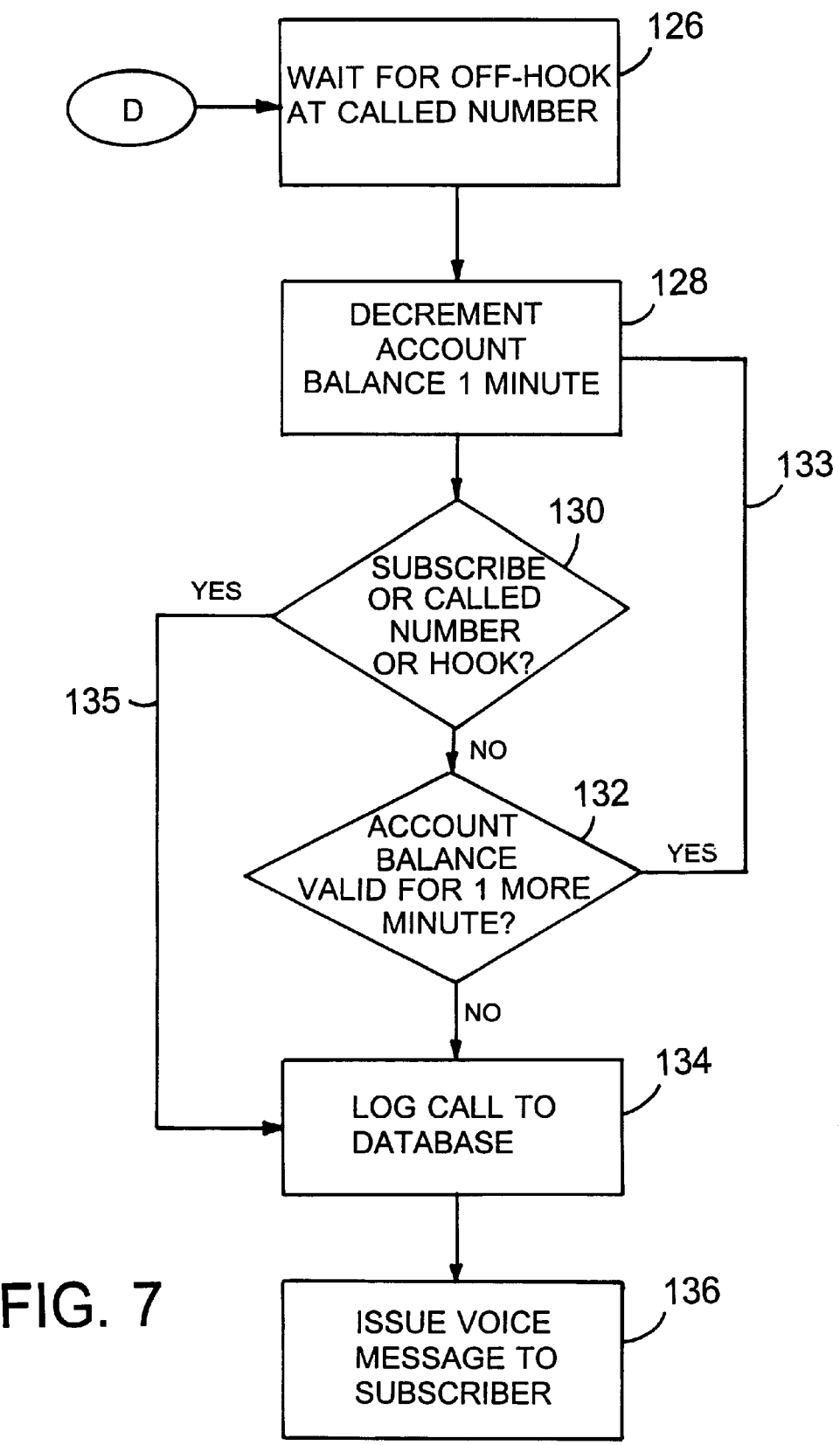
FIG. 7 is a flow diagram illustrating call accounting processing at a host computer in accordance with the present invention.

Immediately upon occurrence of an off-hook condition at the called number, the call accounting flow illustrated in FIG. 7 is executed. while the CO negotiates and seizes a T1 line from the local exchange carrier, the host computer waits at block 126 for an off-hook condition at the called number. Immediately upon occurrence of an off-hook condition at the called number, the account balance in memory is decremented by a predetermined value, corresponding to a minimum time rate based upon the DNIS and the time of day rate, e.g., $0.02 for each six seconds of telecommunications time at an off-peak, i.e., after 7:00 p.m. local time. Thus, for example, immediately upon occurrence of an off-hook condition at the destination number, a minimum time value of one minute is decremented from the account balance resident in memory.

In accordance with the preferred embodiment of the present invention, the account balance read into memory is translated to a time value based upon the caller number (DNIS) and the time of day rate applicable. In this manner, the account balance is converted to a time value, e.g., number of second or number of minutes, and the time value is decremented based upon elapse of pre-determined time periods while either the subscriber's cellular telephone or the called number are off-hook.

After the elapse of a time period equal to the predetermined minimum time value, the account balance is queried at block 132 to determine if there is a sufficient account balance for an additional quantum of the minimum time value. If a sufficient account balance is determined to exist at block 132, the process loops back 133 and decrement the account balance by the predetermined minimum time value at block 128. Process loop 133 continues to execute until either the subscriber or the called number are on-hook at block 130 or until a negative response issues to the account balance validation at block 132. If either an on-hook condition at the subscriber or the called party at block 130 or the account balance is not validated at block 132, a disconnection occurs, accounting ceases and the call, including the DNIS and the elapsed time of the call are logged to the database resident at the remote server (not shown) and the remaining account balance is written to the database at block 134. The system then bridges to a voice response unit and issues a voice message to the subscriber advising the subscriber of the remaining account balance at block 136. Where it is technically feasible to decrement the account balance directly from the database, without loading the account balance to memory at the host computer, those skilled in the art will understand that the step of writing the adjusted account balance to the database may not be a necessary step.

The foregoing describes the call handling process for outgoing calls from a cellular subscriber. In those cellular service areas where the cellular service is offered only a "calling party pay" basis, there is no need to monitor or control telecommunications events incoming to the subscriber. However, in those cellular service areas where a cellular service is offered on the basis that the subscriber pays telecommunication charges irrespective of whether the subscriber is originating or receiving a call, the present system provides a method for monitoring and controlling incoming cellular telephone calls to the pre-paid subscriber and adjusting the prepaid subscriber's account balance for incoming calls.

Inbound Landline

The security cellular telecommunication system of the present invention also has the ability to accept incoming calls from land-line callers. In general, separate blocks of 10,000 cellular system subscribers' phone numbers are allocated to direct inward dialing (DID) trunks from the local exchange carrier to the cellular system switch. These numbers are the same numbers that are loaded into the mobile telephone service organization (MTSO) or cellular carrier switch as the phone numbers of the system subscribers. If the land-line caller's dialed number matches a phone number dedicated to the inventive cellular system, the call is routed to one of the DID trunks going to the cellular switch. The LEC switch is on a rotation so it will hunt for any available channel at the cellular switch. The signaling on the trunks that pass calls from the LEC to the cellular switch and the cellular switch to the MTSO is a single stage wink-start DID protocol.

Figure 8A:
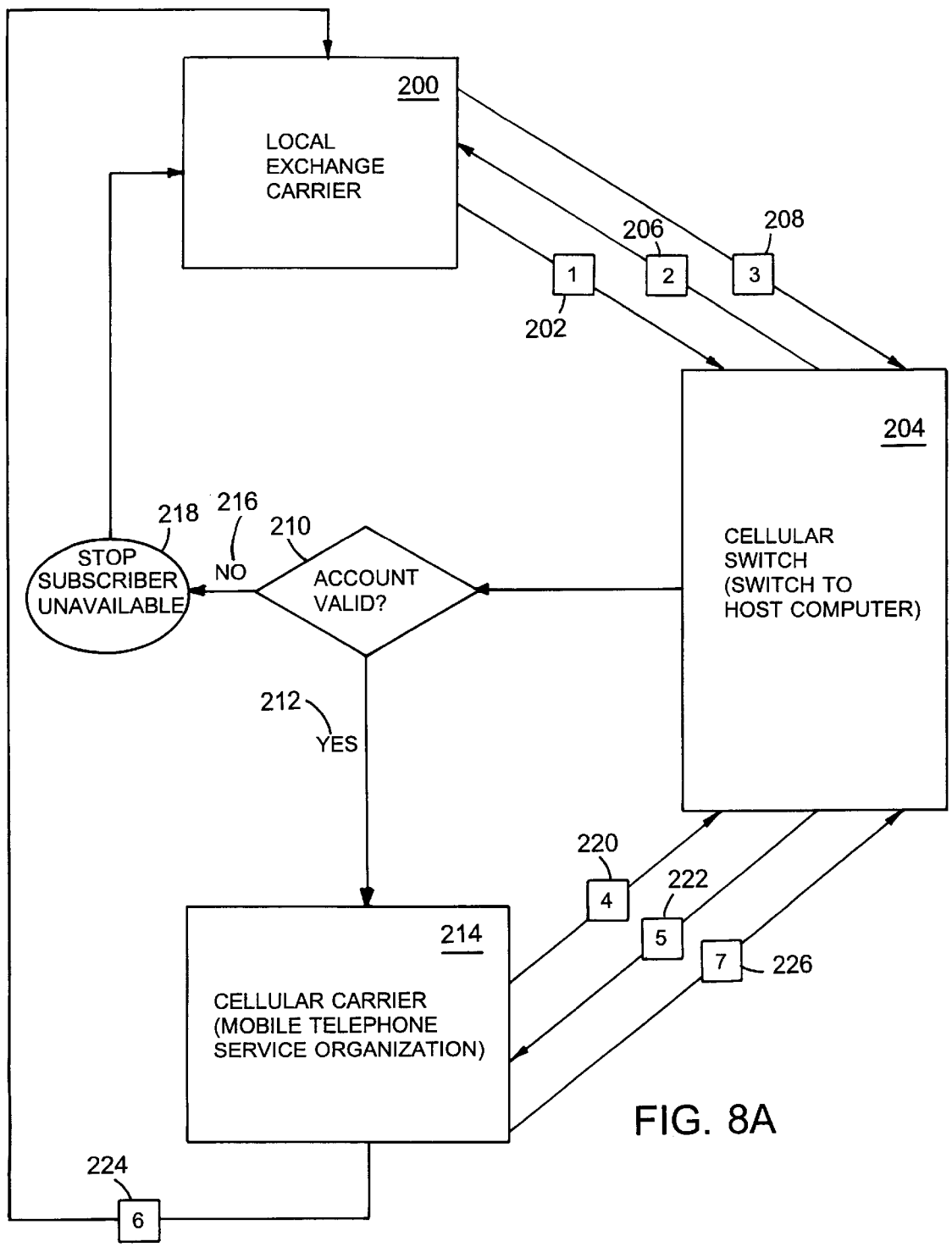
FIG. 8A is a flow diagram illustrating incoming call processing in accordance with the present invention.

FIG. 8A illustrates a flow diagram which depicts the steps to complete the connection of a landline incoming call with a cellular subscriber number in accordance with the present invention. The local exchange carrier (LEC) 200 signals that there is an inbound call from a landline phone attempting to contact a pre-paid subscriber's telephone number unique to the pre-paid cellular telecommunications system of the present invention as shown in Step One 202. The LEC 200 can send signals on any of the available LEC trunk channels. If the signaling for the inbound call is valid, the cellular switch 204 sends a wink signal back to the LEC 200 in Step Two 206 indicating that it is ready to receive digits which relate to the land-line caller's dialed number. In Step Three 208, the LEC 200 sends a multi-frequency digit string comprised of either the last four, seven, or ten digits of the land-line caller's dialed number. The number of digits sent will depend on the direct inward dialing trunk setup. The string of digits is prefaced by a key pulse (KP) digit and flanked by a stop (ST) digit. The land-line caller's dialed number will be a cellular system subscriber's telephone number that the land-line caller is trying to reach. The number of digits sent may be appended to a system configurable default area code and/or prefix depending on the number of digits that are initially sent by the LEC 200. If the LEC 200 fails to send all of the digits within a specified period of time, the error is logged and the system returns to waiting for the LEC 200 to signal that it has an incoming call.

Once the cellular switch 204 receives all of the digits, the cellular switch 204 checks for account validity 210 relating to the dialed digits. The cellular switch 204 which enables access to the host computer for the cellular system allows a check of whether the account is active, whether the account is subject to restrictive dialing (e.g., restricted either by time of day that cellular system is activated or by telephone numbers that cellular system is allowed to connect with), and whether there is sufficient money in the account to pay for a one minute call based on the subscriber's air-time rate table. If the account is determined to be valid for use 212 in relation to the incoming call, the cellular switch 204 signals the cellular carrier (CC) or mobile telephone service organization (MTSO) 214 that there is a call coming. If the account is not valid for use 216, the land-line caller is notified that the cellular system subscriber is unavailable 218. The call is then logged and the system returns to wait for the LEC to signal that it has a new incoming call. The steps involved in checking for account validity are further detailed in FIG. 8B.

Figure 8B:
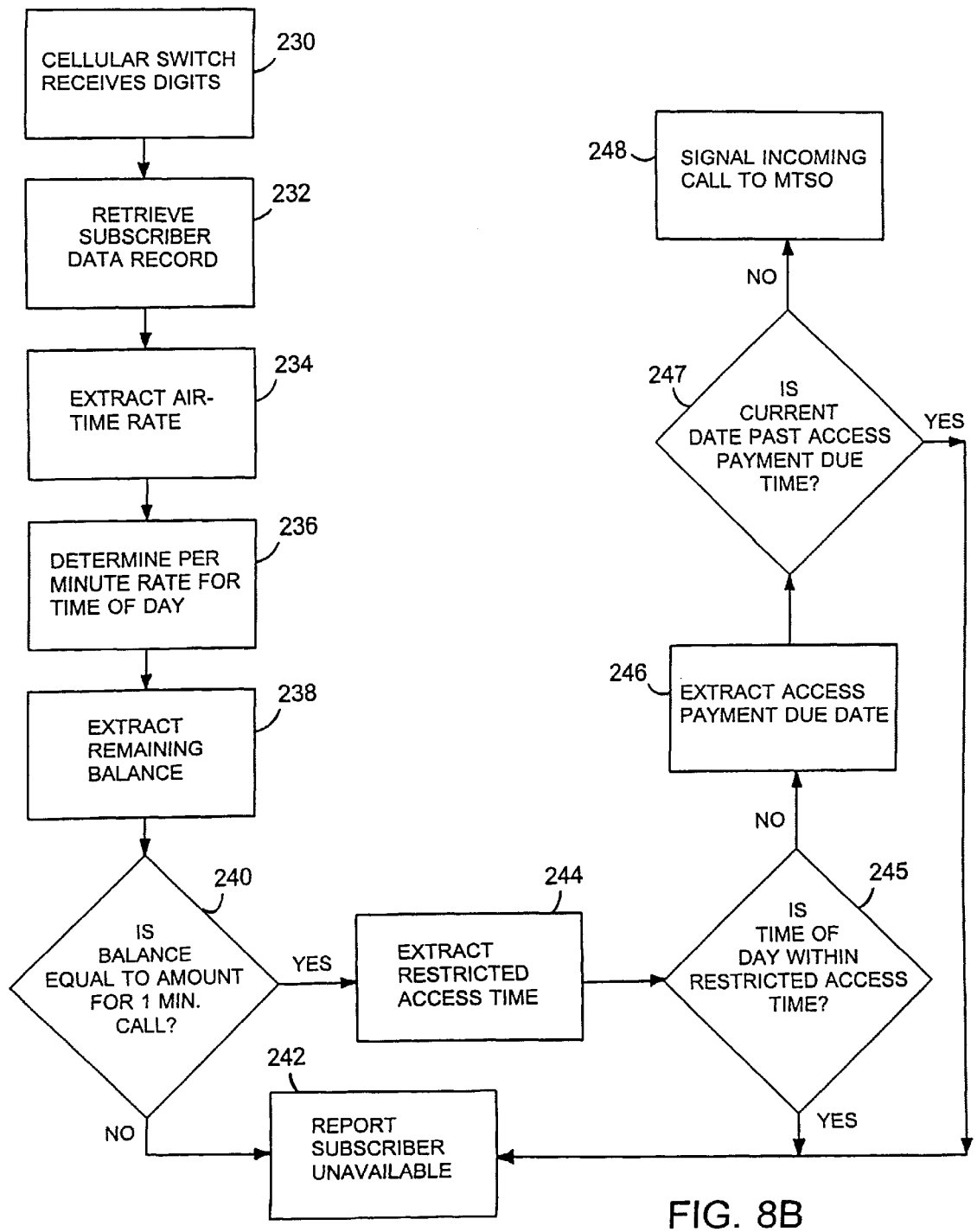
FIG. 8B is a flow diagram illustrating account validation.

FIG. 8B shows a flow diagram for determining account validity. After the cellular switch receives the dialed digits in block 230, the subscriber's data record is retrieved from the host computer database in block 232. Next, the subscriber's basic air-time rate table is extracted in block 234 from the subscriber's data record. The rate table identifies peak and off-peak rates for weekdays, weekends, and holidays. A real-time-clock runs on the cellular system. The real-time-clock is used to identify the current time of day and the per minute air-time rate for that time of day is selected in block 236.

The subscriber's remaining balance is extracted from the subscriber's data record in block 238 and block 240 calculates whether the subscriber's account balance holds an amount of money that is equal to the amount required for at least a one minute call at that time of the day. If there is not an adequate amount in the subscriber account for a one minute call, the land-line caller receives a message in block 242 that the subscriber is unavailable. If there is an adequate amount of money in the subscriber's account, the subscriber's restricted access time is extracted from the subscriber's data record in block 244.

The subscriber record will contain a time-of-day that the subscriber's phone is to be activated and a time-of-day that the subscriber's phone is to be deactivated. The period of time falling outside of these parameters is the subscriber's restricted access time and the time period falling within these parameters is the subscriber's "active window". Block 245 determines whether the current time of day falls within the subscriber's restricted access time. If the current time of day falls within the subscriber's restricted access time, the land-line caller receives notification in block 242 that the subscriber is unavailable. If the current time of day falls outside of the subscriber's restricted access time, the access payment due date is extracted from the subscriber's data record in block 246. Block 247 determines whether the current date is past the access payment due date. If the current date is past the subscriber's access payment due date, the land-line caller is notified in block 242 that the subscriber is unavailable. If the current date is not past the subscriber's access payment due date, the cellular switch signals the MTSO that there is an incoming call in block 248.

Returning now to FIG. 8A, the next available MTSO trunk channel is used to signal the MTSO 214 that there is an incoming call. If all of the MTSO channels are unavailable, the land-line caller is notified by a busy signal and the system returns to waiting for the LEC 200 to send a signal that there is an incoming call. Once there is an available MTSO trunk channel and the cellular switch 204 signals the MTSO 214 that there is an incoming call, the MTSO 214 winks back to the cellular switch 204 in Step Four 220 indicating that the MTSO 214 is ready to receive the dialed digits. If the MTSO 214 does not wink back in a specified period of time, the error is logged and the system returns to locating an available MTSO trunk channel and signaling the MTSO 214 that there is an incoming call. In Step Five 222, the cellular switch 204 sends a multi-frequency digit string to the MTSO 214 which comprises the cellular system subscriber's telephone number that the land-line caller is trying to call. The digit string is prefaced by a KP digit and flanked by a ST digit.

The inbound LEC trunk channel is then connected to the MTSO trunk channel in Step Six 224, thereby providing an audio path for the call and allowing the caller to hear ringing of the subscriber's telephone. If the MTSO 214 does not detect a connection (i.e. there is either a busy signal or no answer) within a specified period of time, the audio path between the LEC 200 and the MTSO 214 is disconnected, the call is logged, and the system returns to waiting for the LEC 200 to signal that there is another incoming call. Alternatively, if the MTSO 214 detects a valid answer indicating that the subscriber has taken their phone "off hook", the valid answer signal is sent to the cellular switch 204 in Step Seven 226 so that the account balance can be debited. The subscriber account balance is then debited per minute in accordance with previously described FIG. 7.

Prepaid Calling Cards

The security cellular telecommunication system of the present invention also includes a prepaid calling card procedure. The purpose of the prepaid calling card is to provide a convenient means for the cellular system subscribers to purchase additional air-time and pay monthly access fees. Calling cards for use with the inventive system are printed, bundled, and made widely available at outlets such as convenience stores, grocery stores, etc. The calling cards are sold in fixed denominations so that a subscriber can purchase a specific number of cards in order to raise their account to a desired balance. However, the prepaid calling cards do not allow a subscriber or user to start an account, stop an account, or change restrictions or prompt language.

Calling cards for a specified area are printed with a unique and encrypted number which allows them to be tracked by a point-of-sale (POS) system. The encrypted number includes a special dialing string, the card type, possible card value, local area code, and a form of checksum. The special dialing string is an identifier to the system cellular switch that the incoming call is coming from a calling card and is to be handled as such. The card type identifies whether the card is an air-time credit or a monthly access credit. The card value provides variable credit values. The local area code identifies where the card was purchased so that cards purchased from the jurisdiction of one area's POS database could not be used in another. The checksum provides a cursory way of checking the entire number for a possible mis-dial when the subscriber calls the number in.

Figure 9:
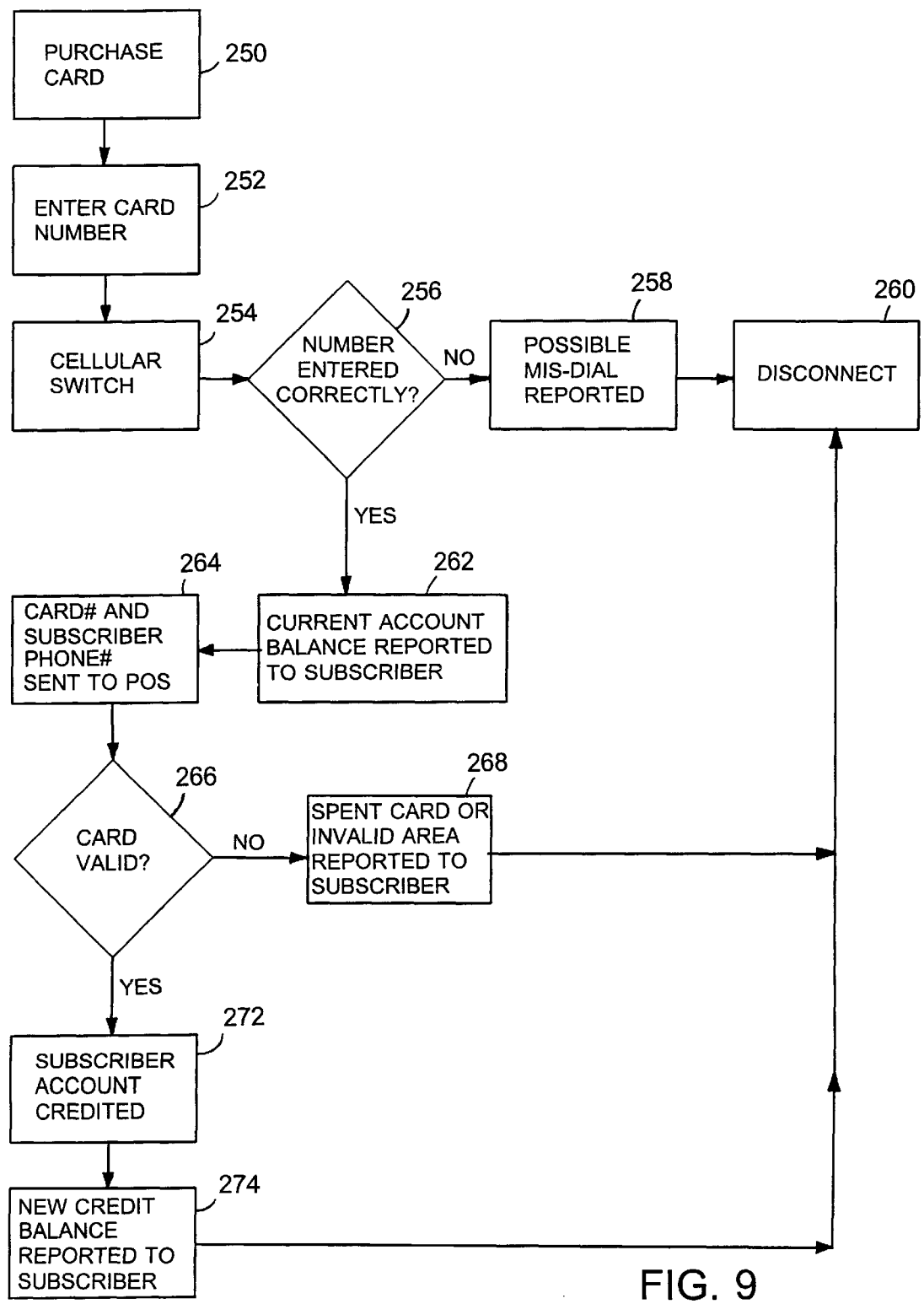
FIG. 9 is a flow diagram illustrating prepaid calling and processing.

The POS system holds a database of all "spent" or "used" calling cards for its area. When a subscriber purchases a card and enters it into their telephone, the POS checks to see that the card has not been previously used by checking the card's number against a list of "spent" cards A flow diagram showing the prepaid calling card method is illustrated in FIG. 9. A subscriber purchases one or more calling cards at block 250 from an outlet such as a convenience store or a grocery store, as previously described above. The prepaid calling cards are of two types, either air-time credit cards or monthly access credit cards. After purchasing a card, the subscriber enters the card number into the keypad of their system cellular telephone at block 252. After entering the number, the subscriber presses the "send" key just as in making a regular telephone call on the cellular telephone. The system cellular switch receives the number at block 254 and uses the special dialing string to determine that the call is to be processed as a calling card transaction.

The cellular switch then performs a cursory checksum check of the number entered at block 256 to validate that the number was entered correctly and not mis-dialed. If an invalid checksum results, a possible mis-dial is reported to the subscriber at block 258 and the call is disconnected at block 260 without incurring any charges. If a valid checksum results, the system cellular switch reports the subscriber's current account balance to the subscriber at block 262 and the cellular switch sends the received card number and the subscriber's telephone number to the POS system at block 264. At this point, air-time charges begin to accrue and are incurred by the subscriber for the duration of the transaction.

The card number is validated at block 266 where the card number entered is compared with a list of card numbers that have already been "used" or "spent". If the card number entered is found on the "used" list, the subscriber is informed of the card's "spent" status at block 268 and the call is disconnected at block 260. The validation step at block 266 also instructs the POS to check that the card being entered is a card that is valid for the specific POS system by comparing the local area code field of the card number with the POS area code identifier. If the area code relating to the calling card is found to be invalid for the area covered by the POS, the invalid area is reported to the subscriber at block 268 and the call is disconnected at block 260.

If the card number is determined to be valid at block 266, the subscriber's account is credited at block 272 according to the card type and value. The new credit balance is then reported to the subscriber at block 274 and the call is disconnected at block 260.

When a prepaid access fee credit card is entered into the system, the access fee is covered for another month and the access fee due date is updated accordingly. Multiple access fee due dates being entered during any one given month will result in the access fee due date moving farther and farther out in time. The entire procedure outlined in FIG. 9 must be repeated for each individual calling card.

Interface Between System Cellular Switch and Point-of-Sale (POS)

Figure 10:
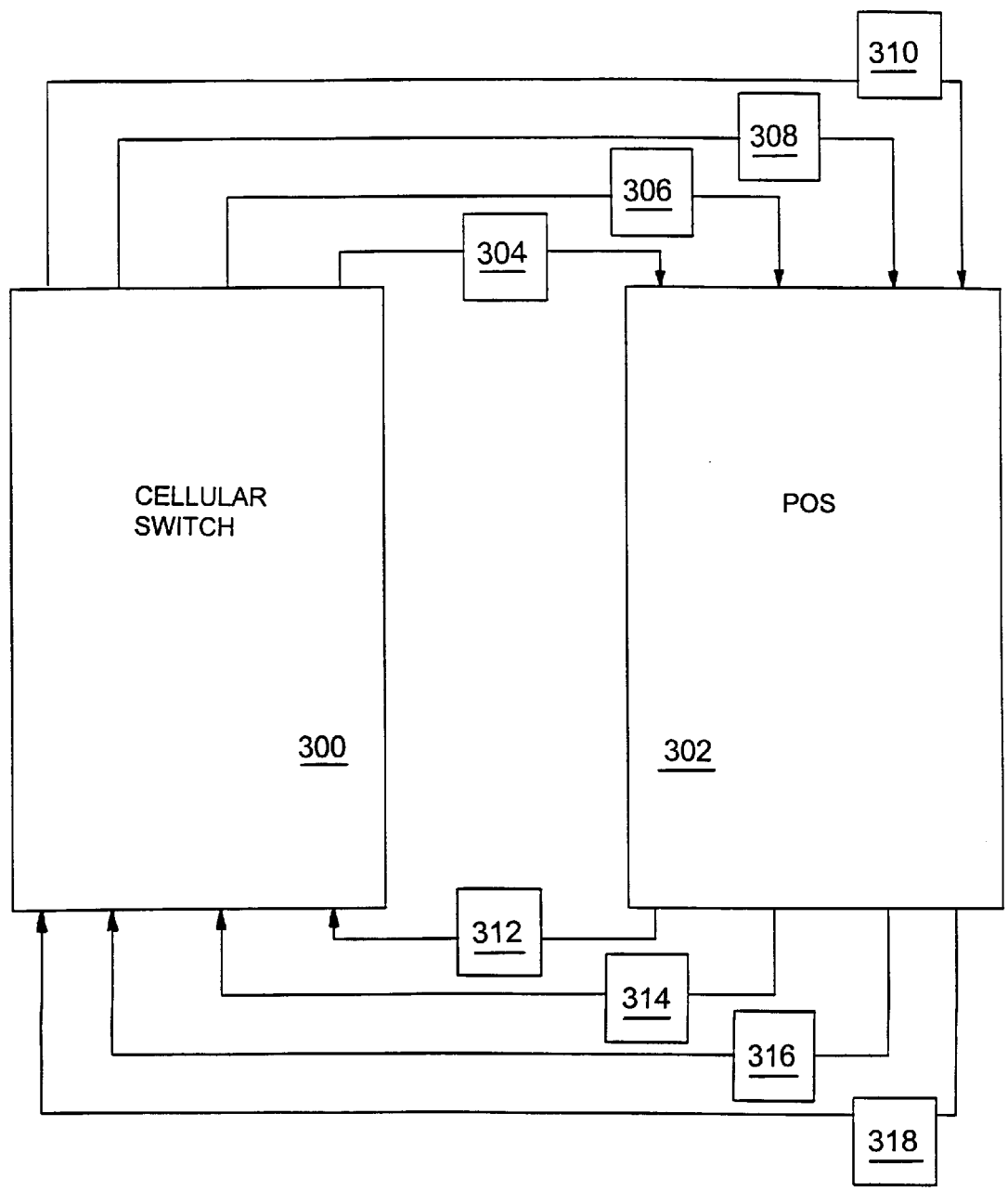
FIG. 10 is a flow diagram illustrating interface processing between the system cellular switch and the point-of-sale (POS).

The system cellular switch is connected to the Point-of-Sale system via an Ethernet link. Messages and data packets are passed back and forth to perform desired transactions. FIG. 10 illustrates the possible types of transactions between the system cellular switch 300 and the POS 302.

A number of transactions are carried out by sending or transferring information from the cellular switch 300 to the POS 302. For example, the call activity logging function in block 304 involves passing information about a specific call that was recently terminated from the cellular switch 300 to the POS 302 for insertion into the database. The information is then archived in the system and can be used to provide a detailed report on call activity. Further, the calling card validation and account crediting function in block 306 transfers the subscriber's telephone number and the calling card number they entered into their cellular telephone from the cellular switch 300 to the POS 302 for card validation and subsequent account crediting.

Also, the cellular switch 300 in block 308 confirms to the POS 302 that requested updates to a subscriber's data record have been successfully executed. Finally, the switch error annunciation function in block 310 sends information about a switch error from the cellular switch 300 to the POS 302 so that those viewing a terminal are alerted that there is a problem.

There are also s number of transactions that are carried out by sending or transferring information from the POS 302 to the cellular switch 300. For example, the call activity logging acknowledgment function in block 312 confirms to the cellular switch 300 that the received activity record has been successfully archived into the POS database. Also, the calling card validation response function in block 314 informs the cellular switch 300 that the received calling card number for a specified subscriber is either valid or invalid. Further, acknowledgment for receiving an error message from the cellular switch is sent from the POS 302 to the cellular switch 300 in block 316 to indicate that the error message has been successfully archived and that the proper notification has taken place. Finally, the subscriber update function in block 318 sends the modified subscriber data record which has been updated at the POS 302 from the POS 302 to the cellular switch 300 where it replaces the current record information for that subscriber.

Thus, in the present invention, the disadvantages of the prior art are overcome, particularly as those disadvantages would affect a cellular user. By eliminating the need for the user to make unnecessary dialing entries and limit the user's dialing entry only to the destination number the present invention represents a valuable and needed advance in the art. Additionally, by using the ANI to identify the subscriber, rather than the situs of the call, the present invention provides for transparent call processing for the end-user and achieves a fraud tolerance level not presently available to service providers.

Further, the present invention allows for prepaid cellular subscribers to accept incoming calls even when their cellular service requires payment for incoming calls. Also, the present invention includes a prepaid calling card means which allows subscribers to conveniently purchase and add additional air time as well as pay for monthly access fees.

Finally, the present invention provides for a unique interface between the system cellular switch and the pint-of-sale (POS) which enables specifically desired transactions to take place such as providing particular reports, validating cards and crediting accounts, validating account updates, and identifying problems within the system.

While the invention has been described with reference to its preferred embodiments, those skilled in the art will understand and appreciate from the foregoing that variations in equipment, operating conditions and configuration may be made and still fall within the spirit and scope of the present invention which is to be limited only by the claims appended hereto.

what is claimed is:

1. A method of increasing a level of credit in a user account in a preauthorized telecommunications service, the method comprising:
   receiving information from a wireless communications device, the information comprising an identifier, and user-input, obtained from a vended medium, that represents a specific, predetermined level of credit;
   routing the received information to a wireless service provider based on the identifier; and
   modifying an account at the wireless service provider based on the user-input, wherein modification of the account comprises increasing a level of credit available for wireless telecommunications service by the predetermined level of credit.

2. The method of claim 1 in which the wireless service provider comprises a prepaid wireless service provider.

3. The method of claim 1 in which the identifier comprises an automated number identifier (ANI) or an electronic serial number (ESN) or both.

4. The method of claim 1 in which the identifier comprises information other than an automated number identifier (ANI) or an electronic serial number (ESN).

5. The method of claim 1 in which the identifier comprises information identifying a prepaid wireless subscriber.

6. The method of claim 1 in which the identifier comprises information identifying the wireless communications device.

7. The method of claim 1 in which the routing of the identifier is transparent to a user of the wireless communications device.

8. The method of claim 1 in which the wireless communications device comprises a cellular telephone.

9. The method of claim 1 in which the user-input comprises data generated by a user-input device associated with the wireless communications device.

10. The method of claim 9 in which the user-input device comprises a keypad on the wireless communications device.

11. The method of claim 1 in which the user-input comprises an encrypted number.

12. The method of claim 1 in which the user-input comprises information representing one or more fields of data.

13. The method of claim 12 in which the fields of data comprise one or more of the following: a dialing string field indicating that an account is to be modified, a card type field, a card value field, a local area code field, and a checksum field.

14. The method of claim 1 in which the user-input comprises information other than a destination number (DNIS).

15. The method of claim 1 in which the user-input comprises an alphanumeric sequence.

16. The method of claim 15 in which the alpha/numeric sequence input by the user corresponds to one or more telecommunications service units.

17. The method of claim 15 in which the alpha/numeric sequence input by the user corresponds to information obtained from a prepaid wireless telecommunications card.

18. The method of claim 17 in which data associated with previously used preauthorized telecommunications cards is stored in a database.

19. The method of claim 15 in which the alpha/numeric sequence input by the user uniquely identifies a prepaid wireless telecommunications card purchased by or for the user of the wireless telecommunications device.

20. The method of claim 1 in which the credit is available for air-time credit or monthly access credit or both.

21. The method of claim 1 in which modification of the account further comprises identifying a wireless subscriber from the received information and adjusting that wireless subscriber's account based on the user-input.

22. The method of claim 1 in which at least a portion of the received information indicates that a wireless subscriber's account is to be modified.

23. The method of claim 1 in which routing comprises identifying a specific wireless service provider based on the information received from the wireless communications device.

24. The method of claim 1 in which the user-input is associated with a record in a database.

25. The method of claim 24 wherein the record in the database correlates the user-input with the specific, predetermined level of credit.

26. A method, performed at a wireless service provider, of managing preauthorized telecommunications service, the method comprising:
   receiving, at the wireless service provider, a transmission sequence from a wireless communications device comprising user-input corresponding to information obtained from a prepaid wireless telecommunications card containing an alpha/numeric value that represents a specific, predetermined level of credit; and
   modifying, at the wireless service provider, accounting data associated with the wireless communications device based on information in the transmission sequence.

27. The method of claim 26 in which the accounting data is modified in response to receipt of a single transmission sequence from a wireless communications device.

28. The method of claim 26 in which the transmission sequence is delimited by entry of a transmit command on the wireless communications device.

29. The method of claim 28 in which entry of the transmit command comprises pressing a "send" key on a keypad of the wireless communications device.

30. The method of claim 26 further comprising receiving, at the wireless service provider, a static identifier of the wireless communications device.

31. The method of claim 30 in which the user-input corresponds to information obtained from a prepaid wireless telecommunications card.

32. The method of claim 30 in which the static identifier comprises an automated number identifier (ANI) or an electronic serial number (ESN) or both.

33. The method of claim 32 further comprising transmitting the static identifier with the user-input in a manner that is transparent to a user of the wireless communications device.

34. The method of claim 26 further comprising, prior to receipt of the transmission sequence at the wireless service provider, receiving the transmission sequence from the wireless communications device at a wireless telecommunications center and passing it on to the wireless service provider.

35. The method of claim 26 further comprising receiving, at the wireless service provider, an identifier of an account of the user of the wireless communications device.

36. The method of claim 26 wherein the alpha/numeric value includes a checksum.

37. The method of claim 26 in which an account associated with the wireless communications device is located based on an identifier of the wireless communications device.

38. The method of claim 37 in which the identifier is an ANI.

39. The method of claim 37 in which the identifier is an ESN.

40. The method of claim 37 in which the identifier is transmitted to the wireless service provider transparently to the user of the wireless communications device.

41. A method of managing preauthorized telecommunications service, the method comprising:
   entering an alpha/numeric sequence corresponding to and obtained from a preauthorized wireless telecommunications card into a wireless communications device the alpha/numeric sequence representing a specific, predetermined level of credit;
   transmitting to a wireless telecommunications center the entered alphanumeric sequence and information indicative of the wireless communications device;
   identifying a wireless service provider based on the information indicative of the wireless communications device;
   routing the entered alphanumeric sequence and the information indicative of the wireless communications device to the identified wireless service provider; and
   modifying an account associated with the wireless communications device based on the entered alphanumeric sequence.

42. A method of managing preauthorized telecommunications service, the method comprising:
   receiving information from a wireless communications device, the information comprising an identifier and user-input, obtained from a vended medium, that comprises an encrypted number and that represents a specific, predetermined level of credit;
   routing the received information to a wireless service provider based on the identifier; and
   modifying an account at the wireless service provider based on the user-input.

43. The method of claim 42 wherein at least a portion of the encrypted number is used to locate a record in a database.

44. The method of claim 42 wherein the encrypted number is derived using a cryptographic process that encodes a predetermined level of credit associated with the card into the encrypted number.

45. A method of managing preauthorized telecommunications service, the method comprising:
   receiving information from a wireless communications device, the information comprising an identifier and user-input, obtained from a vended medium, that comprises information other than a destination number (DNIS) and that represents a specific, predetermined level of credit;
   routing the received information to a wireless service provider based on the identifier; and
   modifying an account at the wireless service provider based on the user-input.

46. A method of managing preauthorized telecommunications service, the method comprising:

receiving information from a wireless communications device, the information comprising an identifier and user-input, obtained from a vended medium, that comprises an alpha/numeric sequence input by the user that corresponds to one or more telecommunications service units, the user-input representing a specific, predetermined level of credit;

routing the received information to a wireless service provider based on the identifier; and modifying an account at the wireless service provider based on the user-input.

47. A method of managing preauthorized telecommunications service, the method comprising:

receiving information from a wireless communications device, the information comprising an identifier and user-input that comprises an alpha/numeric sequence input by the user that corresponds to information obtained from a prepaid wireless telecommunications card and that represents a specific, predetermined level of credit;

routing the received information to a wireless service provider based on the identifier; and modifying an account at the wireless service provider based on the user-input.

48. A method of managing preauthorized telecommunications service, the method comprising:

receiving information from a wireless communications device, the information comprising an identifier and user-input that comprises an alpha/numeric sequence input by the user that uniquely identifies a prepaid wireless telecommunications card purchased by or for the user of the wireless telecommunications device, the user-input representing a specific, predetermined level of credit;

routing the received information to a wireless service provider based on the identifier; and modifying an account at the wireless service provider based on the user-input.

49. A method of managing preauthorized telecommunications service, the method comprising:

receiving information from a wireless communications device, the information comprising an identifier and user-input, obtained from a vended medium, that represents a specific, predetermined level of credit;

routing the received information to a wireless service provider based on the identifier; and modifying an account at the wireless service provider based on the user-input, wherein modification of the account comprises increasing a level of credit available for wireless telecommunications service.

50. The method of claim 49 in which the credit is available for air-time credit or monthly access credit or both.

51. A method, performed at a wireless service provider, of managing preauthorized telecommunications service, the method comprising:

at the wireless service provider, receiving from a wireless communications device a transmission sequence that comprises user-input that corresponds to information obtained from a prepaid wireless telecommunications card and that represents a specific, predetermined level of credit, the transmission sequence further comprising a static identifier of the wireless communications device; and modifying, at the wireless service provider, accounting data associated with the wireless communications device based on information in the transmission sequence.

52. A method of managing preauthorized telecommunications service, the method comprising:

entering into a wireless communications device an alpha/numeric sequence corresponding to a preauthorized wireless telecommunications card containing an alpha/numeric value that represents a specific, predetermined level of credit;

transmitting to a wireless telecommunications center the entered alpha/numeric sequence and information indicative of the wireless communications device;

identifying a wireless service provider based on the information indicative of the wireless communications device;

routing the entered alpha/numeric sequence and the information indicative of the wireless communications device to the identified wireless service provider; and increasing a level of credit available for wireless telecommunications service in an account associated with the wireless communications device based on the predetermined level of credit associated with the entered alpha/numeric sequence.

53. A method of increasing the level of credit of user accounts in a prepaid wireless telecommunications system, the method comprising:

receiving, at a wireless service provider, information from the user of a wireless communications device, the information comprising user-input and an identifier of a user account, wherein the user-input comprises an alpha/numeric value supplied to the user in response to the user purchasing a specific, predetermined level of credit to be applied to the user account, the user-input representing the specific, predetermined level of credit;

determining, at the wireless service provider, the level of credit associated with the user input; and increasing a level of credit available for wireless telecommunications service in the user account by the determined level of credit associated with the user-input.

54. An article of manufacture for use in a preauthorized wireless telecommunications system comprising:

a card; and at least one surface of the card on which is displayed an alpha/numeric value;

the alpha/numeric value representing a specific, predetermined level of credit to be applied to an account of a user of a wireless telecommunications device, wherein upon receipt of the alpha/numeric value and an identifier of the wireless telecommunication device by a wireless service provider, the level of credit in the account is increased by the predetermined level.

55. A method of increasing a level of credit in a user account associated with a wireless telecommunications device used in a prepaid wireless telecommunications system comprising the steps of:

(a) providing a user of the wireless telecommunication device an alpha/numeric value in exchange for a monetary payment for wireless telecommunication services, wherein the alpha/numeric value represents the amount of the monetary payment;

(b) entering the alpha/numeric value into the wireless communications device;

(c) sending an identifier of an account of a subscriber to the prepaid wireless communications system and the alpha/numeric value to a computer having access to a database containing information associated with the accounts of subscribers to the prepaid wireless telecommunications system, wherein the computer retrieves the account identified by the identifier, determines the predetermined level of credit associated with the alpha/numeric value, and increases the level of credit in the account identified by the identifier by the predetermined level of credit.

56. A method of increasing the level of credit in a user account in a preauthorized telecommunications service, the method comprising:

receiving information comprising an identifier and user-input corresponding to and obtained from a preauthorized wireless telecommunications card containing an alpha/numeric value that represents a specific, predetermined level of credit at a computer with access to a database containing information associated with the accounts of subscribers to the preauthorized telecommunications service; and modifying an account of a user identified by the identifier, wherein modification of the account comprises increasing a level of credit available for wireless telecommunications service by the predetermined level of credit.

* * * * *